(12) United States Patent
Sanai et al.

(10) Patent No.: US 7,754,781 B2
(45) Date of Patent: Jul. 13, 2010

(54) ACTIVE ENERGY BEAM-CURABLE COMPOSITION

(75) Inventors: Yasyuki Sanai, Nagoya (JP); Atsushi Nagasawa, Nagoya (JP)

(73) Assignees: Toagosei Co., Ltd., Tokyo (JP); Kuraray Co., Ltd., Okayama (JP)

( * ) Notice: Subject to any disclaimer, the term of this patent is extended or adjusted under 35 U.S.C. 154(b) by 61 days.

(21) Appl. No.: 11/885,124

(22) PCT Filed: Feb. 27, 2006

(86) PCT No.: PCT/JP2006/003560

§ 371 (c)(1),
(2), (4) Date: Aug. 27, 2007

(87) PCT Pub. No.: WO2006/093075

PCT Pub. Date: Sep. 8, 2006

(65) Prior Publication Data

US 2008/0194727 A1 Aug. 14, 2008

(30) Foreign Application Priority Data

Feb. 28, 2005 (JP) .................. 2005-052488

(51) Int. Cl.
- B32B 17/10 (2006.01)
- C08F 20/22 (2006.01)
- G03B 21/60 (2006.01)
- G02B 1/10 (2006.01)

(52) U.S. Cl. .............. 522/154; 522/180; 522/182; 359/456; 359/581

(58) Field of Classification Search ........... 522/154, 522/180, 182, 172; 359/456, 581

See application file for complete search history.

(56) References Cited

U.S. PATENT DOCUMENTS

| 5,969,867 | A | * | 10/1999 | Fukushima et al. | ......... | 359/581 |
| 7,095,464 | B2 | * | 8/2006 | Ito | ......................... | 349/112 |

FOREIGN PATENT DOCUMENTS

| JP | 63-199713 A | 8/1988 |
| JP | 02-269701 A | 11/1990 |
| JP | 07-247306 A | 9/1995 |
| JP | 10-007432 A | 1/1998 |
| JP | 2000-035506 A | 2/2000 |
| JP | 2000-338310 A | 12/2000 |
| JP | 2002-241509 A | 8/2002 |
| JP | 2003-156605 A | 5/2003 |
| JP | 2003-255118 A | 9/2003 |

* cited by examiner

*Primary Examiner*—Mark Eashoo
*Assistant Examiner*—Jessica Paul
(74) *Attorney, Agent, or Firm*—Fitch, Even, Tabin & Flannery

(57) ABSTRACT

An active energy beam-curable composition is provided, which is excellent in coatability to films and safety, and particularly suitable for use in a light diffusion film since a light diffusion film made of a cured product of the composition is excellent in both haze and total light transmittance. The active energy beam-curable composition comprises an ethylenically unsaturated group-containing compound (A) that contains, as an essential component thereof, a compound having an ethylenically unsaturated group and an aromatic group, and a granular substance (B) that is insoluble in the component (A), in which the subtraction of the refractive index of the component (B) from the refractive index of a cured product of the component (A) alone is not less than 0.03 and not more than 0.18.

22 Claims, No Drawings

ACTIVE ENERGY BEAM-CURABLE COMPOSITION

This Application is the U.S. National Stage Application under 35 U.S.C. 371 of International Application PCT/JP/2006/303560 filed Feb. 27, 2006 which claims benefit from Japanese patent application number 2005-052488 filed Feb. 28, 2005, the complete disclosures of which are incorporated herein by reference.

TECHNICAL FIELD

The present invention relates to an active energy beam-curable composition and more preferably to an active energy beam-curable composition for use in light diffusion films, and belongs to technical fields of the active energy beam-curable composition and the light diffusion film.

BACKGROUND ART

Liquid crystal display units, which are built in, for example, liquid crystal display-based devices such as personal computers, television sets and cellular phones, have light diffusion films or light diffusion sheets (collectively referred to as "light diffusion films" in the present specification) installed in the backlight units thereof for the purpose of improving visibility.

The most fundamental optical characteristics required for light diffusion films include a total light transmittance of visible light of 90% or more and a haze value of 70% or more.

As light diffusion films, those having the surface roughened have been known.

Such light diffusion films have been produced by roughening the surface of transparent films of resins such as polyethylene terephthalate resin, polymethylmethacrylate resin and polycarbonate resin by embossing or sandblasting; however, it has been difficult to obtain light diffusion films excellent in both light transmission and light diffusivity by simply roughening the surface of the films.

As those that have solved the above-mentioned problems, there are light diffusion films that have light diffusing materials dispersed therein and light diffusion films that have a light diffusion layer formed on the surface thereof.

As the light diffusion films having light diffusing materials dispersed therein, those in which light diffusing materials such as calcium carbonate, titanium oxide, glass beads, silica particles, polystyrene particles, silicone resin particles and crosslinked polymer particles are dispersed in transparent resinous films are known.

However, such light diffusion films as described above are high in viscosity of the resins which form the films, and thus suffer from a problem such that it is difficult to uniformly disperse the light diffusing materials. Therefore, light diffusion films having a light diffusion layer formed on the surface thereof have come to be explored.

As the light diffusion films having a light diffusion layer formed on the surface thereof, those which are produced by coating the surface of the films with a composition of a light diffusing material dispersed in a solution of a plastic or curable resin binder, followed by drying or curing are known (for example, Patent Documents 1 to 3).

Patent Document 1: Japanese Patent Laid-Open No. H07-209502 (Claims)

Patent Document 2: Japanese Patent Laid-Open No. H07-218705 (Claims)

Patent Document 3: Japanese Patent Laid-Open No. H11-160505 (Claims)

DISCLOSURE OF THE INVENTION

Problems to be Solved by the Invention

However, conventional light diffusion films having a light diffusion layer formed on the surface thereof suffer from the following problems.

For example, light diffusion films are known in which polyester resin is used as a resin binder (Patent Documents 1 and 2). However, polyester resin is generally high in viscosity and poor in coatability, and hence is often used as diluted with an organic solvent; actually, in the examples of Patent Document 2, a resin diluted approximately to a concentration of 50% by mass with an organic solvent has been used. The method using such a resin binder requires a step for removal of the solvent in the process of producing a light diffusion film, and thus is lower in productivity and unfavorable for safety.

As a solution of the above-mentioned problems, there has also been proposed a method in which no solvent-containing resin binder is used, but a composition of plastic particles dispersed as a light diffusing material in an ultraviolet light-curable compound is coated on a transparent film and the composition is cured by ultraviolet irradiation to prepare a light diffusion film (Patent Document 3). This method requires no solvent removal, and is thus advantageous in that it excels in productivity and safety.

In the method disclosed in Patent Document 3, however, the refractive index of the ultraviolet light-curable compound is as low as approximately 1.50, and thus a material having a high refractive index has to be used as the light diffusing material since the difference in refractive index between the ultraviolet light-curable compound and the light diffusing material is required to be as large as possible in order to obtain a light diffusion effect. In other words, there has been a problem such that those usually used in light diffusion films, such as glass beads, silica particles and other inorganic particles and methacrylate beads are too low in refractive index to be used, and thus usable are only melamine beads and others high in refractive index. However, melamine beads are problematic in that they are higher in specific gravity than methacrylate beads and hence tend to precipitate, and further, when the refractive index of the cured product of the ultraviolet light-curable compound as a constituent is relatively high, for example, 1.55 or more, sufficient light diffusivity cannot be obtained.

Thus, the present inventors have made a diligent study for the purpose of discovering an active energy beam-curable composition which is excellent in coatability to films and safety, and particularly suitable for use in a light diffusion film or provides cured products excellent in both haze and total light transmittance when used in a light diffusion film.

Means for Solving the Problems

The present inventors have made various investigations for the purpose of solving the above-mentioned problems, and consequently have perfected the present invention by discovering that a composition comprising a compound having an aromatic group and an ethylenically unsaturated group in combination with a granular substance shows a light diffusivity that is excellent and suited to a light diffusion sheet and further transmits light which is not biased to any particular wavelength or does not departs from white light when the difference in refractive index between the cured product resulting from the above compound alone and the granular substance satisfies a specific value.

It is to be noted that, in the present specification, (meth)acrylate denotes acrylate or methacrylate.

Hereinafter, the present invention will be described in detail.

1. An Ethylenically Unsaturated Group-Containing Compound (A) that Comprises, as an Essential Component Thereof, a Compound Having an Ethylenically Unsaturated Group and an Aromatic Group The present invention uses an ethylenically unsaturated group-containing compound (A) (hereinafter referred to as the component (A)) that comprises, as an essential component thereof, a compound (hereinafter referred to as the aromatic unsaturated compound) having an ethylenically unsaturated group and an aromatic group.

1-1. Aromatic Unsaturated Compound

In the component (A), as the aromatic unsaturated compound, various compounds can be used as long as they have an ethylenically unsaturated group and an aromatic group.

The ethylenically unsaturated group includes a (meth)acryloyl group, a vinyl group, a vinyl ether group, and the like. The (meth)acryloyl group is preferable because it is excellent in photo-radical polymerizability.

The aromatic group includes the groups represented by the following formulas, a phenyl group, a cumyl group, a biphenyl group, and the like. As such aromatic groups, halogen-substituted ones can also be used.

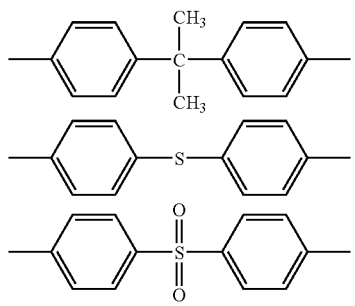

A preferable aromatic unsaturated compound is a (meth)acrylate having an aromatic group (hereinafter referred to as an aromatic (meth)acrylate) because it is excellent in photo-radical polymerizability.

The aromatic (meth)acrylate includes di(meth)acrylates, mono(meth)acrylates, and the like.

1-1-1. Aromatic di(meth)acrylate

The aromatic di(meth)acrylate includes di(meth)acrylate of bisphenol A, di(meth)acrylate of thiobisphenol, di(meth)acrylate of bisphenol S, di(meth)acrylates of alkylene oxide adducts of bisphenol A, thiobisphenol or bisphenol S, di(meth)acrylate of a bisphenol A-type epoxy resin, and the like.

Among these, preferable are di(meth)acrylates (hereinafter referred to as the component (A-1)) represented by the following general formula (1):

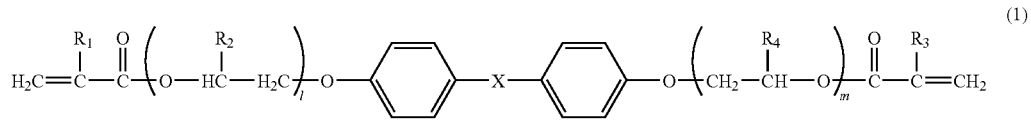

In formula (1), X represents $-C(CH_3)_2-$ or $-S-$, $R_1$ and $R_3$ each independently represent a hydrogen atom or a methyl group, $R_2$ and $R_4$ each independently represent a hydrogen atom, a methyl group or an ethyl group, and $l$ and $m$ each independently represent an integer of 0 to 4.

Preferably, $R_1$ and $R_3$ each independently represent a hydrogen atom because the composition is thereby made excellent in curability. Preferably, $R_2$ and $R_4$ each independently represent a hydrogen atom because the resulting cured product is thereby made excellent in the refractive index.

Preferably, $l$ and $m$ are 0 to 3 because the resulting cured product is thereby made excellent in the refractive index.

Specific examples of the component (A-1) include: those compounds in which X is $-C(CH_3)_2-$ such as di(meth)acrylate of bisphenol A, (meth)acrylates of ethylene oxide adducts of bisphenol A and (meth)acrylates of propylene oxide adducts of bisphenol A; and those compounds in which X is $-S-$ such as bis(4-methacryloxyphenyl)sulfide, bis(4-acryloxyphenyl)sulfide, bis(4-methacryloxyethoxyphenyl)sulfide, bis(4-acryloxyethoxyphenyl)sulfide, bis(4-methacryloxydiethoxyphenyl)sulfide, bis(4-acryloxydiethoxyphenyl)sulfide, bis(4-methacryloxytriethoxyphenyl)sulfide, bis(4-acryloxytriethoxyphenyl)sulfide, and the like.

Among these, preferable are those compounds in which X is $-S-$ because they are easy to adjust the refractive index of the cured product.

Among the compounds in which X is $-S-$, more preferable are bis(4-acryloxyethoxyphenyl)sulfide, bis(4-acryloxydiethoxyphenyl)sulfide and bis(4-acryloxyphenyl)sulfide because they are excellent in curability.

1-1-2. Aromatic mono(meth)acrylate

Next, the aromatic mono(meth)acrylate includes (meth)acrylates having a p-cumylphenyl group, (meth)acrylates having a biphenyl group, (meth)acrylates having a phenyl group, and the like.

Among the above-mentioned mono(meth)acrylates, preferable are (meth)acrylates having a p-cumylphenyl group and (meth)acrylates having a biphenyl group because they can impart a high refractive index to the cured products of the composition.

Preferable (meth)acrylates having a p-cumylphenyl group are the (meth)acrylates (hereinafter referred to as the component (A-2-1)) represented by the following general formula (2) because they can prevent crystallization of the composition:

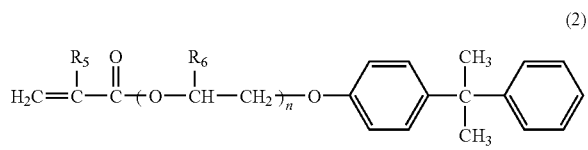

(2)

In formula (2), $R_5$ and $R_6$ each independently represent a hydrogen atom or a methyl group, and n represents an integer of 0 to 4.

Specific examples of the component (A-2-1) include p-cumylphenyl (meth)acrylate, p-cumylphenoxyethyl (meth)acrylate, and the like.

For the component (A-2-1), $R_5$ is preferably a hydrogen atom because this provides good curability. Additionally, n is preferably 0 to 2 and more preferably 0 because this can provide the cured product with a higher refractive index and maintain the viscosity of the composition to be low.

Among these, preferable are p-cumylphenyl acrylate and p-cumylphenoxyethyl acrylate because they are liquid at room temperature and thus easy to handle, high in refractive index and readily available.

Preferable (meth)acrylates having a biphenyl group are the (meth)acrylates (hereinafter referred to as the component (A-2-2)) represented by the following general formula (3):

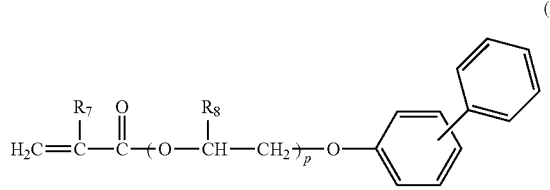

(3)

In formula (3), $R_7$ and $R_8$ each independently represent a hydrogen atom or a methyl group, and p represents an integer of 0 to 4.

Specific examples of the component (A-2-2) include o-phenylphenyl (meth)acrylate, m-phenylphenyl (meth) acrylate, p-phenylphenyl (meth)acrylate, o-phenylphenoxyethyl (meth)acrylate, m-phenylphenoxyethyl (meth)acrylate, p-phenylphenoxyethyl (meth)acrylate, and the like.

Among these, preferable are o-phenylphenyl (meth)acrylate and o-phenylphenoxyethyl (meth)acrylate because they are liquid at room temperature and thus easy to handle, and readily available. Among these, particularly preferable is o-phenylphenyl (meth)acrylate with p=0 because it can maintain the viscosity of the composition to be low.

Examples of the aromatic (meth)acrylate other than those described above, in particular, (meth)acrylates having a phenyl group include benzyl (meth)acrylate, phenoxyethyl (meth)acrylate, 2-hydroxy-3-phenyloxypropyl (meth)acrylate, tribromophenyl (meth)acrylate, and the like.

1-2. Ethylenically Unsaturated Group-Containing Compounds Other than Aromatic Unsaturated Compounds The component (A) of the present invention may contain ethylenically unsaturated group-containing compounds other than the aromatic unsaturated compounds (hereinafter referred to as other unsaturated compounds).

Preferable other unsaturated compounds are (meth)acrylates. Specific examples thereof include: mono(meth)acrylates such as tetrahydrofurfuryl (meth)acrylate, carbitol (meth)acrylate, N-vinylcaprolactone, (meth)acryloylmorphorine, glycidyl (meth)acrylate, 2-hydroxyethyl (meth) acrylate, 2-hydroxypropyl (meth)acrylate, (meth)acrylates having a maleimide group, and 1,4-butanediol mono(meth) acrylate; poly(meth)acrylates such as 1,6-hexanediol di(meth)acrylate, nonanediol diacrylate, polyethylene glycol di(meth)acrylate, ethylene glycol di(meth)acrylate, tribromophenyloxyethyl (meth)acrylate, trimethylolpropane tri (meth)acrylate and pentaerythritol tetra(meth)acrylate; (meth)acrylate oligomers such as polyurethane poly(meth) acrylates and polyester poly(meth)acrylates; and the like.

The preferable mixing proportion of the other unsaturated compound falls within a range from 0 to 50% by mass in the component (A).

As the component (A), two or more types of the above-described components can also be used in combination.

As the component (A), a combination of the component (A-1) with the component (A-2-1) and/or the component (A-2-2) is preferable because such a combination makes the composition low in viscosity and is excellent in dispersibility of the component (B). In this case, the ratio between the component (A-1) and the component (A-2-1) and/or the component (A-2-2) is preferably such that (A-1):(A-2-1) and/or (A-2-2)=10:90 to 70:30 (by mass) because such a ratio makes the composition low in viscosity and provides the cured product with satisfactory physical properties.

2. Granular Substance (B)

As the granular substance (B) (hereinafter referred to as the component (B)) in the present invention, various substances can be used as long as they are insoluble in the component (A).

Specific examples thereof include: plastics such as (meth) acrylate polymers, (meth)acrylate-styrene polymers, polystyrenes, polyethylenes and melamine resins; inorganic substances such as silica, alumina, barium sulfate, calcium carbonate, aluminum hydroxide, titanium dioxide and glass; and the like.

Among these, preferable are plastics because the plastics hardly precipitate in the composition and are excellent in stability.

Further, among these plastics, (meth)acrylate polymers and (meth)acrylate-styrene polymers are more preferable because they are satisfactory in compatibility with the component (A) and relatively low in refractive index. Furthermore, methacrylate polymers and methacrylate-styrene polymers are particularly preferable because they have a high hardness and a high glass transition temperature.

Monomers constituting the (meth)acrylate polymers and (meth)acrylate-styrene polymers include methyl (meth)acrylate, ethyl (meth)acrylate, propyl (meth)acrylate, butyl (meth)acrylate, and the like. Preferable are those produced by using them in combination with crosslinkable (meth)acrylates such as ethylene glycol di(meth)acrylate and trimethylolpropane tri(meth)acrylate because they are excellent in heat resistance and hardness.

Average particle size of the component (B) is preferably 1 to 10 μm. When the average particle size of the component (B) is less than 1 μm, the problem of coloration of the composition sometimes arises. On the other hand, when it exceeds 10 μm, dispersibility of the component (B) in the composition sometimes becomes insufficient. The components (B) different from each other in average particle size can be used in combination, as required.

It suffices that the shape of the component (B) is almost perfectly spherical. The surface of the component (B) may be smooth or porous.

3. Other Components

The composition of the present invention contains the above-mentioned component (A) and the above-mentioned component (B) as essential components, however, other components can be mixed in the composition, as required.

Hereinafter, such other components are individually described.

The composition of the present invention is cured by irradiation with an active energy beam. In this case, the active energy beam includes electron beam, visible light, ultraviolet light, and the like. Among these, preferable are visible light and ultraviolet light because they require no special equipment and are easy to use.

When the present composition is curable with visible light or ultraviolet light, a photopolymerization initiator is mixed therein. However, when the present composition is curable with an electron beam, a photopolymerization initiator is not necessarily required to be mixed in the composition.

Specific examples of the photopolymerization initiator (hereinafter referred to as the component (C)) include: benzoins such as benzoin, benzoin methyl ether and benzoin propyl ether; acetophenones such as acetophenone, 2,2-dimethoxy-2-phenylacetophenone, 2,2-diethoxy-2-phenylacetophenone, 1,1-dichloroacetophenone, 1-hydroxycyclohexyl phenyl ketone, 2-methyl-1-[4-(methylthio)phenyl]-2-morphorino-propan-1-one and N,N-dimethylaminoacetophenone; anthraquinones such as 2-methylanthraquinone, 1-chloroanthraquinone and 2-amylanthraquinone; thioxanthones such as 2,4-dimethylthioxanthone, 2,4-diethylthioxanthone, 2-chlorothioxanthone and 2,4-diisopropylthioxanthone; ketals such as acetophenone dimethyl ketal and benzyl dimethyl ketal; benzophenones such as benzophenone, methylbenzophenone, 4,4'-dichlorobenzophenone, 4,4'-bisdiethylaminobenzophenone, Michler's ketone and 4-benzoyl-4'-methyldiphenyl sulfide; and 2,4,6-trimethylbenzoyldiphenylphosphine oxide.

The components (C) may be used alone or in combinations of two or more.

The component (C) is preferably used in an amount of 0.05 to 10 parts by mass in relation to the component (A)

The composition of the present invention may be supplemented with a heat-polymerization initiator, and may be heated after the irradiation with the active energy beam for the purpose of further promoting the curing.

As the heat-polymerization initiator, various compounds can be used, and preferable are organic peroxides and azo initiators.

Specific examples of the organic peroxides include: 1,1-bis(t-butylperoxy)2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 2,2-bis(4,4-di-butylperoxycyclohexyl)propane, 1,1-bis(t-butylperoxy)cyclododecane, t-hexylperoxyisopropyl monocarbonate, t-butylperoxy maleate, t-butylperoxy-3,5,5-trimethyl haxonoate, t-butylperoxy laurate, 2,5-dimethyl-2,5-di(m-toluoylperoxy)hexane, t-butylperoxyisopropyl monocarbonate, t-butylperoxy2-ethylhexyl monocarbonate, t-hexylperoxy benzoate, 2,5-di-methyl-2,5-di(benzoylperoxy)hexane, t-butylperoxy acetate, 2,2-bis(t-butylperoxy)butane, t-butylperoxy benzoate, n-butyl-4,4-bis(t-butylperoxy)valerate, di-t-butylperoxy isophthalate, α,α'-bis(t-butylperoxy)diisopropyl benzene, dicumyl peroxide, 2,5-dimethyl-2,5-di(t-butylperoxy)hexane, t-butylcumyl peroxide, di-t-butyl peroxide, p-menthane hydroperoxide, 2,5-dimethyl-2,5-di(t-butylperoxy)hexyne-3, diisopropylbenzene hydroperoxide, t-butyltrimethylsilyl peroxide, 1,1,3,3-tetramethylbutyl hydroperoxide, cumene hydroperoxide, t-hexyl hydroperoxide, t-butyl hydroperoxide, and the like.

Specific examples of the azo compounds include: 1,1'-azobis(cyclohexane-1-carbonitrile), 2-(carbamoylazo)isobutyronitrile, 2-phenylazo-4-methoxy-2,4-dimethylvaleronitrile, azodi-t-octane, azodi-t-butane, and the like.

These compounds may be used alone, or in combinations of two or more. Additionally, the organic peroxide may be combined with a reducing agent so as to incorporate redox reactions.

In addition to the above-mentioned components, an antifoaming agent, a leveling agent, an inorganic filler, an organic filler, a photostabilizer, an antioxidant, an ultraviolet absorber and the like may be mixed with the composition, as required. The composition may be supplemented with small amounts of an antioxidant, a photostabilizer, an ultraviolet absorber, a polymerization inhibitor and the like, as required.

4. Active Energy Beam-Curable Composition for Use in Light Diffusion Film

The present invention comprises as the essential components the above-mentioned component (A) and the above-mentioned component (B).

In this case, the refractive index difference derived by subtracting the refractive index of the component (B) from the refractive index of a cured product of the component (A) alone is required to be not less than 0.03 and not more than 0.18. When this value is less than 0.03, the haze becomes low and consequently desired diffusivity cannot be obtained. On the other hand, when it exceeds 0.18, transmitted light becomes highly dependent on wavelength, for example, in such a way that the transmitted light is reddish or yellowish but no longer white light.

It is to be noted that the refractive index referred to in the present invention means the value measured with the sodium D-line at 25° C.

The ratio between the component (A) and the component (B) in the composition is preferably such that the component (A):the component (B)=99:1 to 50:50 (by mass). When the ratio of the component (B) in the composition is less than 1, no sufficient diffusivity can be sometimes obtained. On the other hand, when it exceeds 50, the diffusivity is improved, but sometimes the light transmittance is decreased to such a large extent that the composition is no longer usable for optical applications.

5. Method of Use

Methods of use of the composition of the present invention may follow ordinary methods. Specifically, the composition may be applied to a film or sheet substrate (hereinafter, collectively referred to as a film substrate), and irradiated with an active energy beam to cure.

The film substrate usable in the present invention is preferably a plastic film made of polyethylene terephthalate, polyethylene naphthalate, polyarylate, polyacrylnitrile, polycarbonate, polysulfone, polyethersulfone, polyetherimide, polyetherketone, polyimide, polymethylpentene or the like, more preferable polyethylene terephthalate. Alternatively, if needed, a glass-based substrate can be used.

The film substrate is preferably transparent or translucent (for example, milk-white). In addition, when a film that is previously formed on one side or both sides thereof with fine unevenness by embossing, sandblasting or matting treatment is used, an advantage is obtained in that diffusivity of transmitted light is enhanced. Thickness of the film substrate is generally 20 to 100 μm.

The method for applying the composition of the present invention to the surface of the film substrate may follow ordinary methods including bar coating method, knife coating method, curtain flow coating method, roll coating method, dipping coating method, spray coating method, spin coating method, and the like. From these methods, an appropriate method may be selected according to intended purposes. The composition may be applied to either one side or both sides of the film substrate.

The coating amount may be an amount sufficient to provide a light transmittance and a haze falling within the ranges required for a light diffusion film, and thus may be such that the film thickness after curing is, for example, 10 to 100 µm and preferably approximately 10 to 50 µm. It is to be noted that the film thickness can be measured, for example, by means of the ultrasonic film thickness measurement method. For the purpose of obtaining a high total light transmittance, it is preferable to make the film thickness as thin as possible; however, with the decrease of the film thickness, the haze value is decreased. In the present invention, when the film is as thin as around 10 µm, a high total light transmittance can be balanced with a high haze value because fine unevenness is formed on the surface of the cured film and thereby augments the haze value so as to balance the high total light transmittance with the haze value.

The composition of the present invention is cured by irradiation with an active energy beam, preferably by ultraviolet light which is convenient to handle and low in cost. Ultraviolet irradiation can be conducted by use of an ultrahigh pressure mercury lamp, a high pressure mercury lamp, a low pressure mercury lamp, a metal halide lamp, a carbon arc, a xenon lamp and others which are generally used for curing ultraviolet light-curable compositions. It is preferable to use a high pressure mercury lamp or metal halide lamp which emits ultraviolet light in a range of wavelength of around 365 nm. The ultraviolet irradiation quantity sufficient to cure is 200 mJ/cm$^2$ or more and the preferable quantity is 300 to 2000 mJ/cm$^2$.

The light diffusion film obtained from the composition of the present invention is high in light diffusivity and excellent in light transmission and provides a transmitted light falling nearly in the white light region.

The light diffusion film obtained from the composition of the present invention can be used for various optical electronic display devices, particularly suitably liquid crystal display devices by virtue of the characteristic features thereof.

EFFECTS OF THE INVENTION

The composition of the present invention is free from solvent, low in viscosity, excellent in coatability to films, workability and processability, and additionally excellent in safety. Further, the composition of the present invention can form in a very short time a light diffusion layer on the surface of a film substrate simply by irradiation with an active energy beam.

Further, the cured product of the composition of the present invention is excellent in both haze and total light transmittance, and provides a transmitted light that falls in the white light region of the chromaticity coordinate system and is almost free from wavelength dependence.

BEST MODE FOR CARRYING OUT THE INVENTION

The present invention is an active energy beam-curable composition which comprises, as essential components thereof, the above-mentioned component (A) and the above-mentioned component (B).

As the component (A), preferable is the component (A-1), more preferable is the compound represented by the formula (1) with the proviso that X=S, and particularly preferable is the compound represented by the formula (1) with the proviso that X=S, and l and m each are equal to 0.

Additionally, as the component (A), preferable is one which comprises the component (A-1) in combination with the component (A-2-1) and/or the component (A-2-2).

In this case, as the component (A-2-1), preferable is the compound represented by the formula (2) with the proviso that n=0, and as the component (A-2-2), preferable is the compound represented by the formula (3) with the proviso that p=0.

Preferably, the present composition further comprises a photopolymerization initiator.

Preferably, the component (B) has an average particle size falling within a range from 1 to 10 µm.

The composition of the present invention can be preferably used for the diffusion films.

EXAMPLES

Hereinafter, the present invention will be described in more detail with reference to Examples and Comparative Examples. It is to be noted that hereinafter "parts" means parts by mass.

Component (A)

The components (A) used in Examples and Comparative Examples and the refractive indices of the cured products thereof are shown in Table 1.

It is to be noted that the viscosity of the active energy beam-curable resins (A) was measured with an E-type viscometer at 25° C.

Further, upon measurements of the refractive indices, were used cured products which were obtained by mixing the component (A) shown in Table 1 with 5 parts by mass of IRGACURE 184 (1-hydroxycyclohexylphenyl ketone, IRGACURE 184 (hereinafter referred to as Irg 184) manufactured by Ciba Specialty Chemicals Ltd.), and subjecting the mixture to irradiation with a high pressure mercury lamp equipped with a conveyer under the conditions that the irradiation quantity around 365 nm reached 500 mJ/cm$^2$.

The resultant cured products of the components (A) were subjected to measurement of the refractive index at the sodium D-line (25° C.) by use of an Abbe refractometer DR-M2 manufactured by Atago Co., Ltd.

TABLE 1

| | Component (A) (parts) | | | | | | | | | Physical properties | |
|---|---|---|---|---|---|---|---|---|---|---|---|
| | (A-1) | | | (A-2-1) | | (A-2-2) | | Others | | Viscosity | Refractive |
| No. | BAEPS | M-211B | BAPS | p-CPA | M-110 | o-PPA | TO-1463 | IBXA | THFA | UN-1879 | (mPa·s) | index |
| A1 | 30 | | | 30 | | | | 20 | 20 | | 110 | 1.563 |

TABLE 1-continued

| | Component (A) (parts) | | | | | | | | | | Physical properties | |
|---|---|---|---|---|---|---|---|---|---|---|---|---|
| | (A-1) | | | (A-2-1) | | (A-2-2) | | Others | | | Viscosity | Refractive |
| No. | BAEPS | M-211B | BAPS | p-CPA | M-110 | o-PPA | TO-1463 | IBXA | THFA | UN-1879 | (mPa·s) | index |
| A2 | 30 | | | | 30 | | | | 20 | 20 | 150 | 1.560 |
| A3 | 30 | | | | | 25 | | | 20 | 25 | 123 | 1.566 |
| A4 | 30 | | | | | | 25 | | 20 | 25 | 170 | 1.578 |
| A5 | | 60 | | | 40 | | | | | | 480 | 1.570 |
| A6 | | 60 | | | | | 40 | | | | 450 | 1.581 |
| A7 | | | 20 | | 30 | | | | 30 | 20 | 40 | 1.565 |
| A8 | | 20 | | | | | | 80 | | | 20 | 1.518 |
| A'1 | | | | | | | | | | 100 | 3 × 10$^5$ | 1.490 |

It is to be noted that the abbreviations in Table 1 mean as follows:

BAEPS: Bis(4-acryloyloxyethoxyphenyl)sulfide, namely, a compound represented by the formula (1) with the proviso that X is —S—, $R^1$ to $R^4$ are each a hydrogen atom, and 1 and m are each equal to 1.

M-211B: Diacrylate of bisphenol A modified with 4 mol of ethylene oxide, ARONIX M-211B manufactured by Toagosei Co., Ltd., namely, a compound represented by the formula (1) with the proviso that X is —C(CH$_3$)$_2$—, $R^1$ to $R^4$ are each a hydrogen atom, and 1 and m are each equal to 2.

BAPS: Bis(4-acryloyloxyphenyl)sulfide, namely, a compound represented by the formula (1) with the proviso that X is —S—, $R^1$ to $R^4$ are each a hydrogen atom, and 1 and m are each equal to 0.

p-CPA: p-Cumylphenyl acrylate, namely, a compound represented by the formula (2) with the proviso that $R^5$ and $R^6$ are each a hydrogen atom, and n is equal to 0.

M-110: Acrylate of p-cumylphenol modified with 1 mol of ethylene oxide, ARONIX M-110 manufactured by Toagosei Co., Ltd., namely, a compound represented by the formula (2) with the proviso that $R^5$ and $R^6$ are each a hydrogen atom, and n is equal to 1.

o-PPA: o-Phenylphenyl acrylate, namely, a compound represented by the formula (3) with the proviso that $R^7$ and $R^8$ are each a hydrogen atom, and p is equal to 0.

TO-1463: Acrylate of o-Phenylphenol modified with 1 mol of ethylene oxide, TO-1463 manufactured by Toagosei Co., Ltd., namely, a compound represented by the formula (3) with the proviso that $R^7$ and $R^8$ are each a hydrogen atom, and p is equal to 1.

IBXA: Isobornyl acrylate.

THFA: Tetrahydrofurfuryl acrylate.

UN-1879: Urethane acrylate UN-1879 manufactured by Negami Chemical Industrial Co., Ltd.

Production of Composition

The component (A) and the component (B) shown in the following Table 2 were mixed together under stirring in accordance with an ordinary method to prepare compositions.

The compositions thus obtained were subjected to evaluation of viscosity and stability.

The viscosity of each composition was measured with a B-type viscometer at 25° C.

The stability of each composition was evaluated by placing the composition in a 10-mL test tube and allowing it to stand for one day, and then evaluating occurrence of precipitates with visual observation in accordance with the following two grades.

○: Absolutely no precipitates were found.

x: Precipitates were found.

Preparation of Light Diffusion Film

The composition thus obtained was coated onto a 50-μm thick transparent OPP film (a biaxially stretched polypropylene film TK manufactured by Nippon Polyace K.K.) with a bar coater to form a 50-μm thick film, and then the surface thereof was irradiated with ultraviolet light using a high pressure mercury lamp in a light quantity of 500 mJ/cm$^2$ to cure the composition.

The light diffusion film thus obtained was evaluated in accordance with the following methods.

It is to be noted that, in the adhesion test, there was used a light diffusion film that was prepared in the same manner as described above except that a PET film pre-treated for improving adhesion was used as the substrate film, and the thickness of the coating was 25 μm.

1) Total Light Transmittance and Haze

The obtained light diffusion film was subjected to measurement of total light transmittance in accordance with JIS K7361 (total light transmittance) and measurement of haze in accordance with JIS K7136 (haze), by use of a turbidimeter (model: NDH 2000, manufactured by Nippon Denshoku Industries Co., Ltd.).

2) Chromaticity Coordinates

The obtained light diffusion film was used to determine the chromaticity coordinates x and y by use of a fast integrating sphere-type spectral transmittance meter (model: DOT-3C, manufactured by Murakami Color Research Laboratory Co., Ltd.).

3) Adhesion (Grid Test)

The obtained light diffusion film was used to determine brittleness of the cured layer and adhesion to the film substrate in accordance with JIS K5400, and was evaluated in accordance with the following three grades.

○: The number of the remaining grid sections is 90 or more

Δ: The number of the remaining grid sections is 70 or more x: The number of the remaining grid sections is 69 or less

TABLE 2

| Composition | Physical properties of cured product |
|---|---|

| | (A) (parts) | (B) (parts) | Refractive index difference | Viscosity (mPa·s) | Stability | Haze (%) | Total light transmittance (%) | Chromaticity coordinates x | Chromaticity coordinates y | Adhesion |
|---|---|---|---|---|---|---|---|---|---|---|
| Example 1 | A1 (90) | X-5 (10) | 0.066 | 162 | ○ | 94.2 | 98.5 | 0.3132 | 0.3297 | ○ |
| Example 2 | A1 (80) | X-5 (20) | 0.066 | 260 | ○ | 98.1 | 97.9 | 0.3221 | 0.3299 | ○ |
| Example 3 | A2 (90) | X-5 (10) | 0.063 | 220 | ○ | 93.1 | 97.8 | 0.3132 | 0.3296 | ○ |
| Example 4 | A2 (80) | X-5 (20) | 0.063 | 340 | ○ | 97.8 | 98.8 | 0.3132 | 0.3299 | ○ |
| Example 5 | A3 (90) | X-5 (10) | 0.069 | 186 | ○ | 96.1 | 97.4 | 0.3134 | 0.3297 | ○ |
| Example 6 | A4 (90) | X-5 (10) | 0.081 | 270 | ○ | 96.7 | 98.2 | 0.3136 | 0.3300 | ○ |
| Example 7 | A6 (90) | X-1 (10) | 0.084 | 845 | ○ | 97.5 | 98.6 | 0.3133 | 0.3297 | Δ |
| Example 8 | A6 (90) | MB-1P (10) | 0.084 | 850 | ○ | 89.7 | 95.1 | 0.3134 | 0.3295 | Δ |
| Example 9 | A6 (90) | X-1/X-5 (10) | 0.084 | 840 | ○ | 98.1 | 97.2 | 0.3135 | 0.330 | Δ |
| Example 10 | A7 (90) | X-5 (10) | 0.068 | 85 | ○ | 86.5 | 96.7 | 0.3135 | 0.3265 | ○ |
| Comparative Example 1 | A8 (90) | X-5 (10) | 0.021 | 50 | ○ | 38.7 | 94.1 | 0.3622 | 0.2988 | ○ |
| Comparative Example 2 | A'1 (90) | X-5 (10) | 0.007 | 5 × 10⁵ | —* | — | — | — | — | — |

*The viscosity was too high, and hence the component (B) was not able to be dispersed.

It is to be noted that the abbreviations in Table 2 mean as follows:

X-5: Methacrylate type beads TM-X-5 (average particle size: 5 μm, refractive index: 1.497) manufactured by Toagosei Co., Ltd.

X-1: Methacrylate type beads TM-X-1 (average particle size: 2 μm, refractive index: 1.497) manufactured by Toagosei Co., Ltd.

MB-1P: Methacrylate type beads MB-1P (average particle size: 8 μm, refractive index: 1.495) manufactured by Nihon Junyaku Co., Ltd.

X-1/X-5: Beads obtained by mixing X-1 and X-5 in a mass ratio of X-1:X-5=1:3.

As is clear from the results of Examples, the compositions of the present invention were small in precipitates and excellent in stability, and the cured products thereof were high in both haze and total light transmittance. The chromaticity coordinates of the transmitted light fell in the white light region and almost no wavelength dependence was found in the transmitted light. In particular, the compositions (Examples 1 to 5) containing the component (A-1) with X=S were found to be also excellent in adhesion to the substrate film. Further, the compositions (Examples 1 and 2) in which the component (A-2-1) with n=1 was used and the composition (Example 5) in which the component (A-2-2) with p=0 was used were found to be low in viscosity and excellent in workability.

On the other hand, the composition (Comparative Example 1) which contained the component (A) and the component (B) but the difference in refractive index between these components was less than 0.03 was found to be insufficient in the haze of the cured product thereof and failed to provide white transmitted light. The composition (Comparative Example 2) in which an acrylate other than the component (A) was used was too high in viscosity to enable the dispersion of the component (B).

INDUSTRIAL APPLICABILITY

The composition of the present invention is useful for production of light diffusion films, and the light diffusion films obtained therefrom can be used for liquid crystal display devices and the like.

The invention claimed is:

1. An active energy beam-curable composition consisting essentially of:
    an ethylenically unsaturated group-containing component (A) that consists essentially of, as an essential component, a compound (A-1) having an ethylenically unsaturated group and an aromatic group; and
    a granular substance (B) that is insoluble in the component (A),
    in which the subtraction of the refractive index of the component (B) from the refractive index of a cured product of the component (A) alone is not less than 0.03 and not more than 0.18,
    the component (B) is a plastic; wherein
    the compound (A-1) consists essentially of a di(meth)acrylate (A-1) represented by the following formula (1):

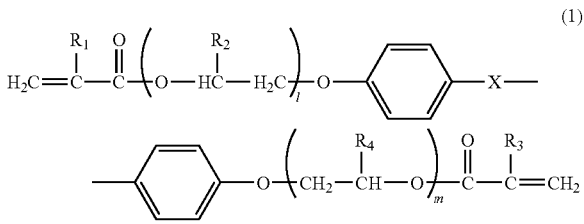

wherein, in the formula (1), X represents —C(CH$_3$)$_2$— or S, R$_1$ and R$_3$ each independently represent a hydrogen atom or a methyl group, $R_2$ and $R_4$ each independently represent a hydrogen atom, a methyl group or an ethyl group, and l and m are each independently an integer of 0 to 4.

2. The active energy beam-curable composition according to claim 1, wherein in the compound (A-1) represented by the formula (1) X=S.

3. The active energy beam-curable composition according to claim 2, wherein in the compound (A-1) represented by the formula (1) X=S, and l=0 and m=0.

4. The active energy beam-curable composition according to claim 2, in which the component (A) consists essentially of the compound (A-1) and a mono(meth)acrylate (A-2-1) represented by the following formula (2) and/or a mono(meth) acrylate (A-2-2) represented by the following formula (3):

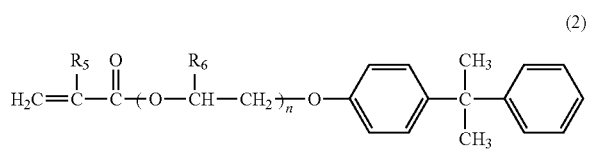

wherein, in the formula (2), $R_5$ and $R_6$ each independently represent a hydrogen atom or a methyl group, and n represents an integer of 0 to 4, and

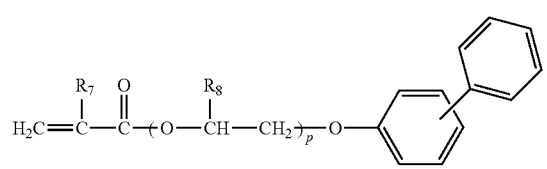

wherein, in the formula (3), $R_7$ and $R_8$ each independently represent a hydrogen atom or a methyl group, and p represents an integer of 0 to 4.

5. The active energy beam-curable composition according to claim 4, wherein in the compound (A-2-1) represented by the formula (2) n=0.

6. The active energy beam-curable composition according to claim 4, wherein in the compound (A-2-2) represented by the formula (3) p=0.

7. The active energy beam-curable composition according to claim 1, wherein said composition includes a photopolymerization initiator.

8. The active energy beam-curable composition according to claim 1, in which the average particle size of the component (B) falls within a range from 1 to 10 μm.

9. An active energy beam-curable composition for use in a light diffusion film, comprising the composition according to claim 1.

10. The active energy beam-curable composition according to claim 3, in which the component (A) consists essentially of the compound (A-1) and a mono(meth)acrylate (A-2-1) represented by the following formula (2) and/or a mono (meth)acrylate (A-2-2) represented by the following formula (3):

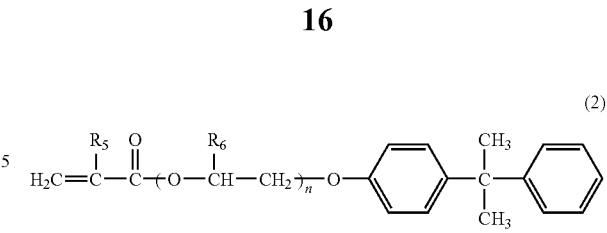

wherein, in the formula (2), $R_5$ and $R_6$ each independently represent a hydrogen atom or a methyl group, and n represents an integer of 0 to 4, and

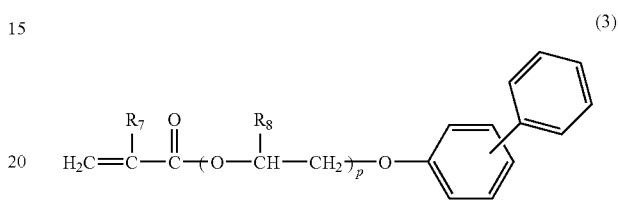

wherein, in the formula (3), $R_7$ and $R_8$ each independently represent a hydrogen atom or a methyl group, and p represents an integer of 0 to 4.

11. The active energy beam-curable composition according to claim 2, wherein said composition includes a photopolymerization initiator.

12. The active energy beam-curable composition according to claim 2, wherein the average particle size of the component (B) falls within a range from 1 to 10 μm.

13. An active energy beam-curable composition for use in a light diffusion film, comprising the composition according to claim 2.

14. The active energy beam-curable composition according to claim 1, wherein component (A) is non-crystalline and blendable with component (B).

15. The active energy beam-curable composition according to claim 1, in which the component (A) consists essentially of said compound (A-1) and a mono(meth)acrylate (A-2-1) represented by the following formula (2) and/or a mono(meth)acrylate (A-2-2) represented by the following formula (3):

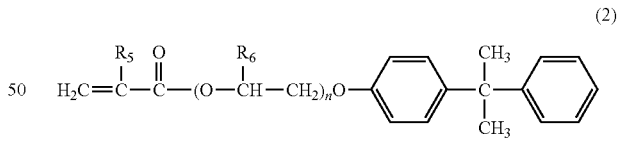

wherein, in the formula (2), $R_5$ and $R_6$ each independently represent a hydrogen atom or a methyl group, and n represents an integer of 0 to 4, and

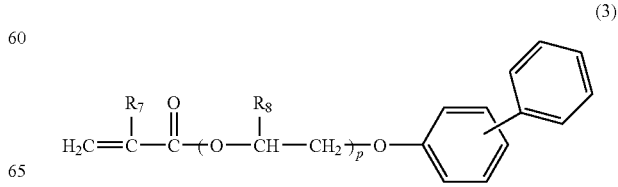

wherein, in the formula (3), $R_7$ and $R_8$ each independently represent a hydrogen atom or a methyl group, and p represents an integer of 0 to 4.

16. An active energy beam-curable composition consisting essentially of:

an ethylenically unsaturated group-containing component (A) that consists essentially of, as an essential component, a compound having an ethylenically unsaturated group and an aromatic group (A-1), wherein said compound (A-1) is represented by the following formula (1):

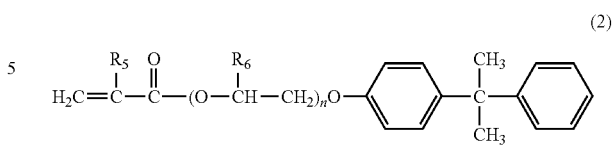

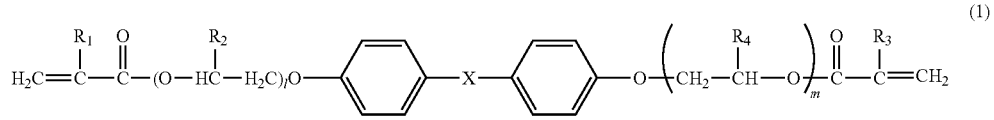

wherein, in the formula (1), X represents —C(CH$_3$)$_2$— or S, $R_1$ and $R_3$ each independently represent a hydrogen atom or a methyl group, $R_2$ and $R_4$ each independently represent a hydrogen atom, a methyl group or an ethyl group, and l and m are each independently an integer of 0 to 4, and at least one non-aromatic ethylenically unsaturated compound that is selected from the group consisting of mono (meth)acrylates, poly(meth)acrylates, and (meth)acrylate oligomers; and a granular substance (B) that is insoluble in the component (A), in which the subtraction of the refractive index of the component (B) from the refractive index of a cured product of the component (A) alone is not less than 0.03 and not more than 0.18, and the component (B) is a plastic.

17. The active energy beam-curable composition according to claim 16, wherein the mono (meth)acrylate is selected from the group consisting of tetrahydrofurfuryl (meth)acrylate, carbitol (meth)acrylate), N-vinylcaprolactone, (meth) acryloylmorphorine, glycidyl (meth)acrylate, 2-hydroxyethyl (meth)acrylate, 2-hydroxypropyl (meth)acylate, a (meth)acrylate having a maleimide group, and 1,4-butanediol mono(meth)acrylate.

18. The active energy beam-curable composition according to claim 16, wherein the poly(meth)acylate is selected from the group consisting of 1,6-hexanediol di(methacryate), nonanediol diacrylate, polyethylene glycol di(meth)acrylate, ethylene glycol di(meth)acrylate, tribromophenyloxyethyl (meth)acrylate, trimethylolpropane tri(meth)acrylate and pentaerythritol tetra(meth)acrylate.

19. The active energy beam-curable composition according to claim 16, wherein the (meth)acrylate oligomer is selected from the group consisting of polyurethane poly (meth)acrylates and polyester poly(meth)acrylates.

20. The active energy beam-curable composition according to claim 16, wherein in the compound (A-1) represented by formula (I) X=S.

21. The active energy beam-curable composition according to claim 16, in which the component (A) consists essentially of said compound (A-1), said at least one non-aromatic ethylenically unsaturated compound, and a mono(meth)acrylate (A-2-1) represented by the following formula (2) and/or a mono(meth)acrylate (A-2-2) represented by the following formula (3):

wherein, in the formula (2), $R_5$ and $R_6$ each independently represent a hydrogen atom or a methyl group, and n represents an integer of 0 to 4, and

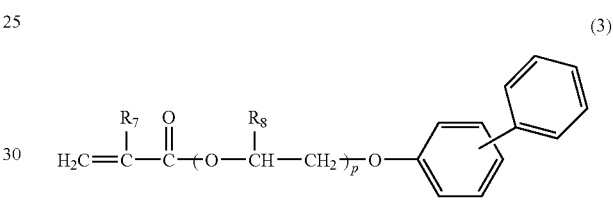

wherein, in the formula (3), $R_7$ and $R_8$ each independently represent a hydrogen atom or a methyl group, and p represents an integer of 0 to 4.

22. The active energy beam-curable composition according to claim 21, wherein said composition contains a photopolymerization initiator.

* * * * *